(12) United States Patent
Peisa (10) Patent No.: US 10,084,717 B2
(45) Date of Patent: *Sep. 25, 2018

(54) SEQUENCE NUMBER UPDATE

(71) Applicant: Telefonaktiebolaget LM Ericsson (publ), Stockholm (SE)

(72) Inventor: Janne Peisa, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/646,632

(22) Filed: Jul. 11, 2017

(65) Prior Publication Data

US 2017/0310603 A1  Oct. 26, 2017

Related U.S. Application Data

(63) Continuation of application No. 15/016,811, filed on Feb. 5, 2016, now Pat. No. 9,722,938, which is a
(Continued)

(30) Foreign Application Priority Data

Jun. 15, 2007  (SE) ...................... 0701488

(51) Int. Cl.
*H04J 3/00* (2006.01)
*H04L 1/18* (2006.01)
*H04L 12/801* (2013.01)
*H04W 72/04* (2009.01)
*H04L 29/08* (2006.01)

(52) U.S. Cl.
CPC ............ *H04L 47/34* (2013.01); *H04L 1/1832* (2013.01); *H04L 1/1848* (2013.01); *H04L 69/324* (2013.01); *H04W 72/0446* (2013.01)

(58) Field of Classification Search
None
See application file for complete search history.

(56) References Cited

U.S. PATENT DOCUMENTS 8,036,129 B2  10/2011  Yi et al.
8,094,599 B2  1/2012  Marinier et al.
(Continued)

FOREIGN PATENT DOCUMENTS

JP  2003258938 A  9/2003
JP  2007510355 A  4/2007
(Continued)

OTHER PUBLICATIONS

InterDigital; "Solutions to reordering issue in Enhanced Cell_FACH"; May 7-11, 2007; 3GPP TSG-RAN WG2#57bis; R2-071620; pp. 1-3.*
(Continued)

*Primary Examiner* — Robert C. Scheibel
(74) *Attorney, Agent, or Firm* — Coats & Bennett, PLLC (57) ABSTRACT

The invention relates to a method and device in a communications network when a User Equipment, UE, needs to update a next expected Transmission Sequence Number, TSN, continuously in order to avoid discarding successive transmissions. The method comprises: resetting a next_expected_TSN value in said network and UE to predetermined values after a predetermined inactivity time.

9 Claims, 4 Drawing Sheets

Related U.S. Application Data continuation of application No. 12/664,373, filed as application No. PCT/SE2008/050613 on May 23, 2008, now Pat. No. 9,288,015.

(56) References Cited

U.S. PATENT DOCUMENTS

| | | |
|---|---|---|
| 2003/0125056 A1 | 7/2003 | Jiang |
| 2008/0225765 A1 | 9/2008 | Marinier et al. |
| 2008/0259832 A1 | 10/2008 | Tseng |
| 2009/0092077 A1* | 4/2009 | Pirskanen ............ H04L 1/1841 370/328 |

FOREIGN PATENT DOCUMENTS

| | | |
|---|---|---|
| WO | 0057594 A1 | 9/2000 |
| WO | 03/096567 A1 | 11/2003 |
| WO | 2005/046086 A1 | 5/2005 |

OTHER PUBLICATIONS

3rd Generation Partnership Project. "3GPP TS 25.321 V6.11.0 (Dec. 2006)." 3rd Generation Partnership Project; Technical Specification Group Radio Access Network; Medium Access Control (MAC) protocol specification (Release 6), Dec. 2006, pp. 1-91, Sophia Antipolis Valbonne France.

Interdigital, "Solution to reordering issue in Enhanced Cell_FACH", 3GPP TSG-RAN WG2#57bis, Kobe, Japan, May 7, 2007, pp. 1-7, Tdoc R2-072197, 3GPP.

Interdigital, "Reordering in Enhanced Cell_Fach", 3GPP TSG-RAN WG2#57bis, Malta, Mar. 26, 2007, pp. 1-2, Tdoc R2-071185, 3GPP.

Interdigital "Solutions to reordering issue in Enhanced Cell_FACH." #GPP TSG-RAN WG2#57bis,Kobe, Japan, Jul. 11, 2007, pp. 1-3, Tdoc R2-071620, 3GPP.

* cited by examiner

SEQUENCE NUMBER UPDATE

CROSS-REFERENCE TO RELATED APPLICATIONS

This application is a continuation of U.S. patent application Ser. No. 15/016,811 filed Feb. 5, 2016, now U.S. Pat. No. 9,722,938, which is a continuation of U.S. patent application Ser. No. 12/664,373, filed Dec. 11, 2009, now U.S. Pat. No. 9,285,015, which is the National Stage of International Application No. PCT/SE2008/050613, filed May 23, 2008, which claims priority to Swedish Patent Application No. SE 0701488-9, filed Jun. 15, 2007, the disclosures of each of which are incorporated herein by reference in their entirety.

TECHNICAL FIELD

The invention is related to handling of data transmissions in a wireless communication network. More specifically, it is related to avoiding the discarding of successive data transmissions between a transmitter and a receiver in a wireless communication network.

BACKGROUND

In wireless communication networks of the latest generation and especially in HSDPA-based (High Speed Downlink Packet Access) wireless communication networks data sent from a base station towards one or more mobile terminals (UEs) may be scheduled for transmission on high-speed channels, such as the HS-DSCH (High Speed Downlink Shared Channel).

Also, a UE in these networks may be in different states in a coverage area serviced by a base station, such as CELL_DCH, CELL_FACH, Enhanced CELL_FACH and other states known to the skilled person.

In the CELL_DCH state, data transmitted on HS-DSCH is grouped into transport blocks (TBs) each of which among others comprises a transmission sequence number (TSN) in the header portion of the TB and the user data in the form of MAC-d PDUs (dedicated Media Access Control Packet Data Units) or MAC-c PDUs (common Media Access Control Packet Data Units) in the payload portion. Using a reordering queue as a buffer for transport blocks received and the TSN from the TB header plus control information sent on a control channel a UE can correctly order the TBs received from the base station and forward them to higher layers as MAC-d or MAC-c PDUs. To make the reordering of the TBs more efficient, each UE has a receiver window having a certain size into which TBs with their TSN are received and a timer (T1 timer) which prevents stalling of the TBs in the reordering queue if some TBs are not correctly received.

After a TB is correctly received, the UE updates a parameter indicating the TSN for the next expected TB.

This reordering mechanism for the TBs received at the UE is based on individual (TSNs) and T1 timers, see for example 3GPP TS 25.321. However, when transmitting data on the HS-DSCH using a common H-RNTI, it is not possible to maintain individual TSNs and T1 timers for individual UEs in the network. A single TSN and T1 timer in the network needs to be used for several UEs.

Additionally, in an HSDPA-based wireless network, the Enhanced CELL_FACH state introduces the reception of data on the HS-DSCH in the CELL_FACH state and therefore potentially higher data rates. The reception of data in the HS-DSCH in CELL_FACH state is similar to the reception of data in the HS-DSCH in CELL_DCH state where some of the differences are stated below.

A user equipment (UE) in the Enhanced CELL_FACH state receives retransmissions on HS-DSCH without sending Hybrid Automatic Repeat reQuest (HARQ) feedback signaling (ACK/NACK). Thus, the transport network does not know whether data has been correctly received or not, but rather retransmissions are decided blindly by the network.

Also, the Enhanced CELL_FACH state offers the possibility to transmit data to UEs using a common HS-DSCH Radio Network Temporary Identifier (H-RNTI). An H-RNTI in an HSDPA network is simply a logical address of a UE in a coverage area of a base station. It is possible that more than one UE can share one common H-RNTI. This is needed for UEs that have entered the coverage area of the base station and in the initial HS-DSCH establishment phase do not have a dedicated H-RNTI assigned yet.

Usually in the Enhanced CELL_FACH state the initial value of the next expected TSN is set to 0 in the UE and the discard window is set to [63-WINDOW_SIZE . . . 63], where WINDOW_SIZE refers to the side of the receiver window. The discard window can be defined as the part of the receiver window which is not accepted for re-ordering of TBs.

Now, as the network is using a common TSN for all UEs using a common H-RNTI, there is a likelihood that the first TSN received by the UE is within the discard window. In this case the UE will discard the received transmission.

One solution to this problem has been proposed in "Solution to reordering issue in Enhanced CELL FACH", 3GPP TSG-RAN WG2#57bis, Kobe, Japan, May 7-11, 2007. It consists of assigning a special initial value to the next expected TSN, and initializing the discard window based on the first received TSN. This solution avoids the problem of discarding initial transmission. However, during continuous reception, it is necessary for the UE to update the next expected TSN continuously in order to avoid discarding successive transmissions. This requires that all (or several) transmitted TSNs are received correctly by the UE. In practice the HS-DSCH is power controlled and it may be difficult for the UE to receive all TSNs.

The present invention offers a solution to at least some of the problems associated with known technology.

SUMMARY

One aspect of the present invention is related to a method for managing communication at a mobile terminal, which may include receiving an initial transmission unit having a shared destination address and comprising an initial shared sequence number and a payload carrying data, determining that the initial transmission unit was correctly received, starting a timer associated with transmission units having a common destination address and a common sequence number, determining that the timer has expired, and resetting the value of sequence number for the next expected transmission unit and the upper boundary of a receiver window in the mobile terminal to a predefined initial value.

In this fashion no initial TBs transmitted to a UE which is using shared destination address (such as a common H-RNTI in HSDPA networks), will be discarded by the UE. Especially during establishment of a radio channel for data transmission, where control data may be communicated on the shared destination address between a UE and a base station, data loss is prevented.

Another aspect of the present invention is related to a mobile terminal for communication in a wireless communication network, where the mobile terminal may include a communication unit for receiving transmission units having a shared destination address and comprising a shared sequence number and payload carrying data, a processing unit configured for examining the transmission units received and determining whether they are correctly received, a measurement unit comprising a timer associated with transmission units having a shared destination address and a shared sequence number where the processing unit is further configured to instruct the measurement unit to start the timer when an initial transmission unit with a shared destination address and shared sequence number is correctly received, the processing unit being further configured to reset the sequence number for the next expected transmission unit and the upper boundary of its receiving window to a predefined initial value upon expiration of the timer.

Yet another aspect of the present invention is related to an infrastructure node for communication in a wireless communication network, where the infrastructure node includes a processing unit configured for forming transmission units comprising a shared sequence number and a payload carrying data to be transmitted to a shared destination address, a communication unit for transmitting the transmission units to the shared destination address, a measurement unit comprising at least one timer associated with transmission units having a shared destination address and a shared sequence number and where the processing unit is configured to instruct the measurement unit to start the one or more timers upon transmission of an initial transmission unit to a shared destination address, the processing unit being further configured to reset the sequence number for the next expected transmission unit and the upper boundary for the transmission window to a predefined initial value upon expiration of the timer.

Finally, another aspect of the present invention is related to a computer program for managing communication in a mobile terminal, which may include instruction sets for receiving an initial transmission unit having a shared destination address and comprising an initial shared sequence number and a payload carrying data, determining that the initial transmission unit was correctly received, starting a timer associated with transmission units having a common destination address and a common sequence number, determining that the timer has expired, and resetting the value of sequence number for the next expected transmission unit and the upper boundary of a receiver window in the mobile terminal to a predefined initial value.

It may be mentioned that the infrastructure node in the wireless communication network may be a base station, a Node B, an access point or some other node with the functionality of the infrastructure node according to the present invention.

BRIEF DESCRIPTION OF THE DRAWINGS

In the following the invention will be described in a non-limiting way and in more detail with reference to exemplary embodiments illustrated in the enclosed drawings, in which.

DETAILED DESCRIPTION

Before the embodiments of the present invention depicted in FIGS. 1-4 are described, some parameters and variables will be defined for better understanding:

Parameter:
Receiver window size (RECEIVE WINDOW SIZE): The RECEIVE_WINDOW_SIZE is the size of the receiver window according to the definition below. This is a parameter in the UE and the value of the parameter is configured by higher layers.

State Variables:
Next expected TSN (next_expected_TSN): The next_expected_TSN is the Transmission sequence number (TSN) following the TSN of the last in-sequence reordering PDU received. It may be updated according to the procedures given. The initial value of next_expected_TSN=0.

Receiver window: The receiver window defines TSNs of those reordering PDUs that can be received in the receiver without causing an advancement of the receiver window according to the procedure below. The size of the receiver window equals RECEIVE_WINDOW_SIZE and spans TSNs going from RcvWndow_UpperEdge−RECEIVE_WINDOW_SIZE+1 to RcvWindow_UpperEdge included.

RcvWindow_UpperEdge: The RcvWindow_UpperEdge represents the TSN, which is at the upper edge of the receiver window. After the first reordering PDU has been received successfully, it also corresponds to the reordering PDU with the highest TSN of all received reordering PDUs. The initial RcvWindow_UpperEdge equals 63. RcvWindow_UpperEdge is updated based on the reception of new reordering PDU according to the procedure given below.

T1_TSN: The TSN of the latest MAC-ehs PDU (enhanced high speed medium access control) that cannot be delivered to the reassembly entity, when the timer T1 is started.

Preferably, all state variables are non-negative integers. Reordering PDUs are numbered by modulo integer Transmission sequence numbers (TSN) cycling through the field 0 to 63. All arithmetic operations, given as example, on next_expected_TSN, RcvWindow_UpperEdge, T1_TSN and TSN_flush are affected by the 64 modulus. When performing arithmetic comparisons of state variables or Transmission sequence number values a 64 modulus base may be used. This modulus base is subtracted (within the appropriate field) from all the values involved and then an absolute comparison is performed. RcvWindow_UpperEdge—RECEIVE_WINDOW_SIZE+1 may be assumed to be the modulus base.

Timers:
Re-ordering release timer (T1): The Re-ordering release timer T1 controls the stall avoidance in the UE reordering buffer as described below. The value of T1 is configured by upper layers.

Reset timer (Treset) (FDD only): Treset controls the reset of the MAC-ehs reordering functionality when the common H-RNTI is used.

Figure 1:
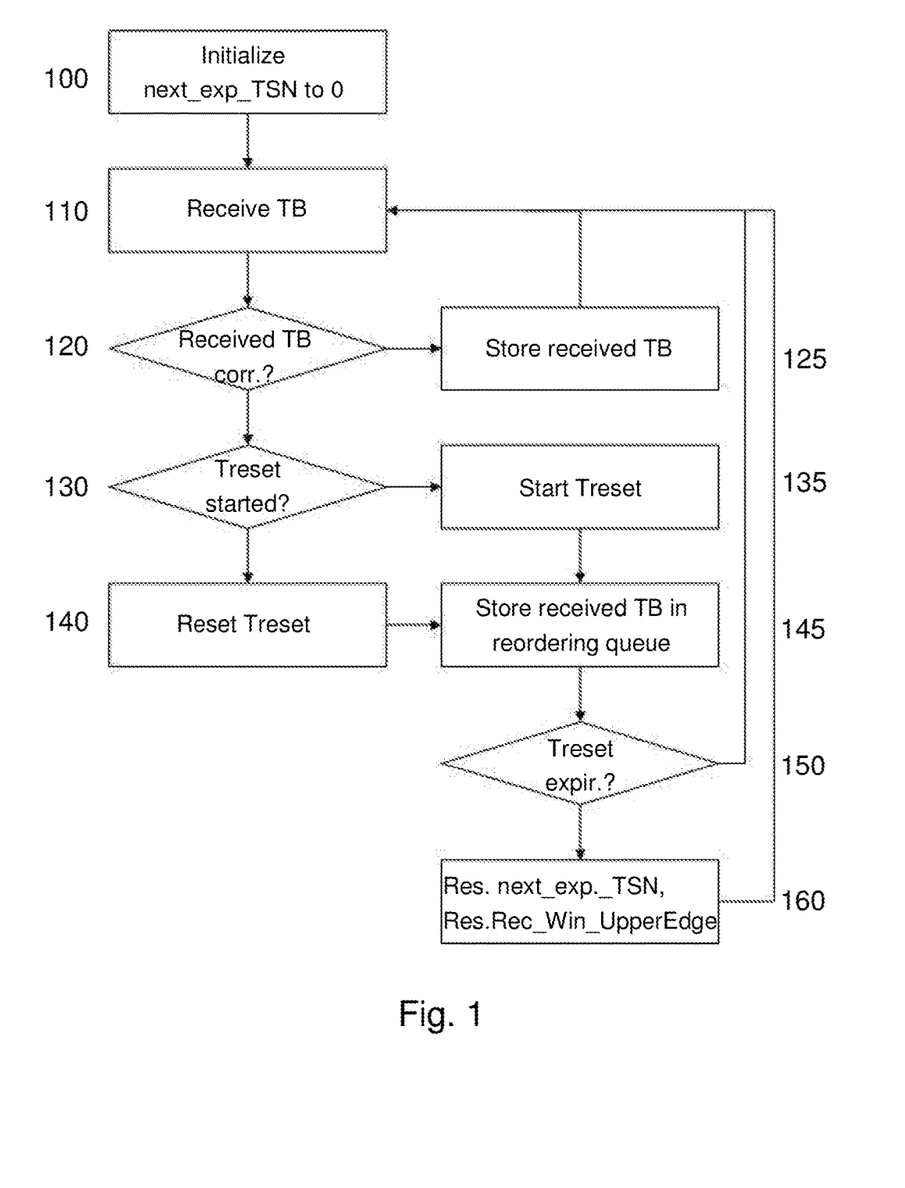
FIG. 1 illustrates schematically a flow chart depicting the steps of a method according to one embodiment of the present invention.

Turning now to FIG. 1, the method steps of the method according to one embodiment of the present invention seen from the perspective of a UE are shown. We assume for simplicity that the UE is operating in a coverage area for a base station which in turn has HSDPA functionality implemented. However, it should be pointed out that the method according to the present invention may be applied in any wireless communication network where mobile terminals in a coverage area of a base station or access point use a shared destination address for data received from the base station, where data is received in transmission blocks which are numbered, where the mobile terminals receive these transmission blocks during a certain receiver window and are able to order the transmission blocks in the right sequence by means of a reordering mechanism. Therefore, the focus on the HSDPA implementation below should only be regarded as a non-limiting illustrative example.

Also, we assume that the UE has just entered the coverage area of the base station and does not have a dedicated destination address allocated, which in the case of the HSDPA network would be a dedicated H-RNTI, but rather has been allocated a common H-RNTI which it shares with other UEs present in the same coverage area. We also assume that the UE is in the CELL_FACH state, meaning that no HS-DSCH has yet been established between the UE and the base station. This is the starting point for the method steps 100-160 which will be described below.

At step 100, the UE initializes the next_expected_TSN parameter to an initial predefined value which may be 0 for example. Thereafter, the UE starts at step 110 receiving an initial TB intended for it on a common H-RNTI, where also each TB has a common TSN. TBs with a common TSN are delivered to the right individual UE by means of the Queue ID in the TB header, as is known to the skilled person.

After the reception of the initial TB at the individual UE, the UE checks at step 120 whether the TB has been received correctly. This may be checked by methods such as CRC (Cyclic Redundancy Check) or other methods known to the skilled person and will not be elaborated here.

In case the TB has not been correctly received, the UE stores at step 125 the received transport block and proceeds to receive either a retransmission or a new TB at step 110 again. Using HARQ for the HS-DSCH, the UE may then attempt to combine several transmissions of the same TB in order to create a correct TB (step not shown in FIG. 1). In contrast to solutions suggested by known technology however, no initial TB intended for the UE which just entered the coverage area of the base station and which is correctly received is discarded if its common TSN lies outside of the UE's receiver window. As mentioned in the description of background art, this may happen if there is more than one UE involved each having their own receiver windows. Instead, if the UE has determined that the TB has been received correctly, it checks, at step 130, whether a timer Treset has been started. If not, the UE starts the Treset timer at step 135. Otherwise, if the Treset timer is already running, it is restarted at step 140. In this fashion, a first TB which is received at the UE, but which normally would be discarded if its common TSN would lie outside the receiver window of the UE, will be accepted by UE and therefore data loss will be prevented. Resetting an already running Treset time will ensure that only one Treset timer is active at a time.

At step 145 the UE stores the correctly received TB in its reordering queue. Thereafter, the UE checks, at step 150, whether the Treset timer has expired. If this is not the case, the UE returns to step 110 and continues receiving additional TBs. However, if the timer Treset has expired, the UE sets, at step 160, the next_expected_TSN to an initial value again (such as to 0) and the RcvWindow_UpperEdge is set to its initial value as well.

The reason for checking whether Treset has expired is that inactivity periods where no transmission blocks are sent can be detected and transport blocks with the right initial TSN expected by the UE can be received avoiding the loss of the initial transmission as is the case with some solutions suggested by known technology.

The invention can be applied instead or in addition to the solution using a special value for the initial value of the next expected TSN. Moreover the Treset timer in the method illustrated in FIG. 1 may be used in any state where the UE is listening to transmissions on a downlink data or control radio channel where a shared destination address is used.

It should be mentioned that the above described method steps are suitable to be implemented by a computer program comprising instructions sets running in an internal or external memory of the UE (not shown).

Figure 2:
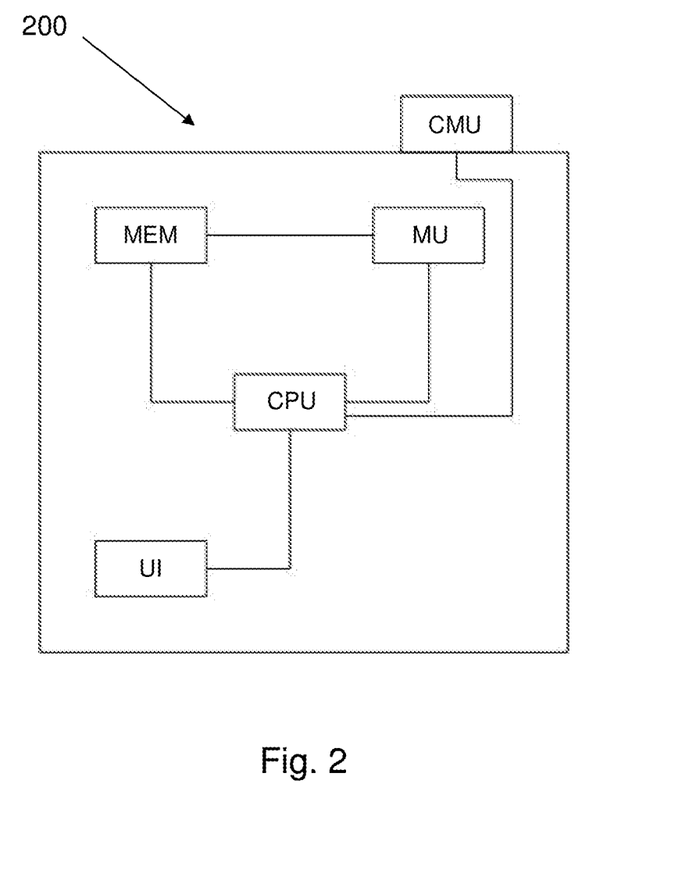
FIG. 2 illustrates in the form of a block diagram a mobile terminal according to one embodiment of the present invention.

FIG. 2 illustrates an UE 200 according to one embodiment of the present invention, where the UE 200 is equipped with a communication unit CMU, a memory MEM, a measurement unit MU, a processing unit CPU and a user interface UI.

The communication unit CMU may be for example implemented as a receiver/transmitter combination adapted for communication in a wireless communication network, such as a UMTS, HSDPA, HSUPA, LTE or some other wireless communication network. Even though the description below focuses on the implementation of the UE in an HSDPA network, it should be borne in mind that the mobile terminal UE may also function in other wireless communication networks.

Moreover, the memory MEM may comprise one or more reordering buffers, where transmission blocks are stored in case not all transmission blocks in sequence have yet been delivered, such that they can later be put in the right order before they are being sent to higher layers for disassembly into PDUs. This is known to the skilled person.

Also, the memory MEM may be internal, external or a combination of the two, where in one part of the memory not comprising the reordering queues a computer program may be running which may comprise instruction sets adapted to execute the method steps described in FIG. 1.

Furthermore, the measurement unit MU may comprise at least two timers, of which the first one T1, is known to the skilled person, while the second Treset is part of the embodiment of the UE according to the present invention. The main task of the measurement unit is to start, restart and expire the timers mentioned above by receiving instructions from the processing unit CPU to do perform these operations.

Since the function of the timer T1 is sufficiently known to the skilled person it will not be described further. The function of the Treset timer on the other hand is, as mentioned earlier, to prevent the discarding of initially transmitted transport blocks sent to a shared destination address, such as a common H-RNTI in the HSDPA implementation.

The processing unit CPU of the UE 200 is adapted to manage functions which are known to the skilled person (such as the T1 timer in the measurement unit MU), but also to instruct the measurement unit to start and restart the Treset timer as well as to set the length Treset timer. Thus the UE 200 according to the present invention may avoid loss of initial transmissions during the establishment of the HS-DSCH when the UE 200 enters a coverage area services by a base station. The start of the Treset timer may by way of example be performed by sending a trigger signal to the measurement unit MU upon receiving transmission on a common H-RNTI (if the UE is operating in an HSDPA-network) and a upon determining that an initial TB has been correctly received. Correct reception of TBs may by way of example be implemented in the processing unit CPU by means of a CRC check, which is known to the skilled person. Those TBs which are correctly received but have a TSN higher than the next expected TSN may be placed by the processing unit CPU in the reordering buffer in the memory MEM for later in-sequence delivery to higher layers of the protocol stack.

Additionally, the processing unit may instruct the measurement unit MU to restart the Treset timer if, by examining the state of the Treset timer, it detects that the latter is still active and that another TB has been correctly received. In this fashion it is ensured that only one Treset timer is active in one UE.

Also, the processing unit CPU is adapted to initialize the next_expected_TSN variable to a predefined initial value, which for example may be 0 before instructing the measurement unit MU to start the Treset timer.

As another function according to the embodiment of the present invention in FIG. 2, the processing unit CPU may be adapted to check whether the Treset timer has expired and reset the next_expected_TSN to the predefined initial value as well as to set the RcvWindow_UpperEdge to a predefined initial value.

Finally, the UE 200 also comprises a user interface UI for facilitating interaction between a user of the UE 200 and the functions provided by the UE 200 which is well-known to the skilled person.

Figure 3:
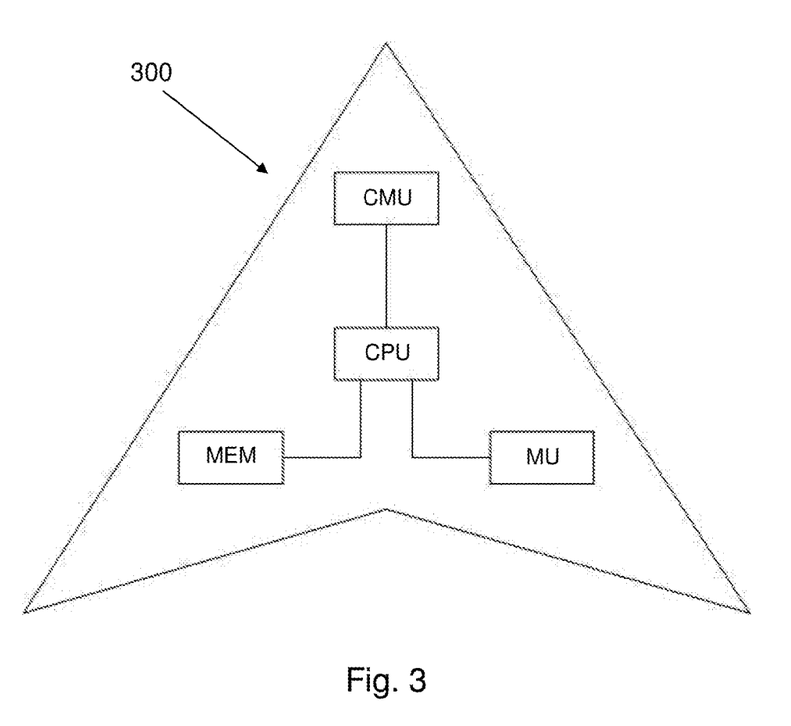
FIG. 3 illustrates schematically in the form of a block diagram a base station according to one embodiment of the present invention.

FIG. 3 illustrates a base station 300 (or a communication gateway) according to one embodiment of the present invention. Even though an HSDPA implementation of the base station 300 is described below, it should be only regarded as an illustrative example. In fact, the base station 300 according to the present invention may be used in any wireless communication network as a Node B, base station transceiver, access point or an infrastructure node performing an analogous function in the network, where data is sent on control and data channels, where mobile terminals in the coverage area use one common destination address in the initial channel setup phase and where there is a risk of losing an initial transmission of a transport block due to it being located outside a receiver window of the one or more UEs. Hence, the base station may be active in such networks as HSDPA, HSUPA (High Speed Uplink Packet Access), 3GPP LTE (Third Generation Partnership Project Long Term Evolution) as well as in other wireless communication networks The base station comprises a communication unit CMU, a processing unit CPU, a memory MEM and a measurement unit MU.

Similar to the function of the communication unit of the UE in FIG. 2, the communication unit CMU comprises a receiver/transmitter combination for receiving and transmitting data from and to one or more UEs which are located in the coverage area of the base station 300. Also, the communication unit CMU is adapted for receiving and transmitting data from and to an RNC (Radio Network Controller).

The processing unit CPU of the base station 300 is adapted for receiving data intended for UEs and storing it into buffers of the memory MEM. In the HSDPA implementation these buffers may have the function of priority queues. Another function of the processing unit CPU is to retrieve data stored from one or more buffers in the memory MEM and to assemble it into transport blocks. As is known to the skilled person, the processing unit CPU may add a TSN into the header portion of such a transport block and attach one or more PDUs containing user or control data into the payload portion of these transport blocks.

Furthermore, the measurement unit MU according to the present invention may comprise one or more Treset timers, where each Treset timer is specific for one UE which is located in the coverage area of the base station 300. Each time the base station 300 registers a new UE entering its coverage area not having a dedicated destination address for control data (such as a dedicated H-RNTI in the HSDPA implementation), the processing unit CPU is adapted to initialize the next_expected_TSN to a predefined initial value and to transmit control data on a shared destination address (for example a common H-RNTI) leading to the establishment of a high-speed downlink channel. At the same time the processing unit CPU instructs the measurement unit MU to start the Treset timer at the start of the transmission of control data to a common destination address and to increment the next_expected_TSN value by 1. As is known to the skilled person, the processing unit CPU may also initiate retransmissions of transport blocks which in this case will have a TSN value different from the next_expected_TSN value.

After the processing unit CPU has detected that the Treset timer in the measurement unit MU has expired the processing unit CPU is adapted to instruct the measurement unit to restart the Treset timer, the next_expected_TSN and the transmission window. In this fashion, after a period of inactivity, the base station 300 can start sending data again without causing initial data loss for UEs that newly entered the coverage area of the base station 300, which would be the case if the next_expected_TSN was simply incremented further.

Figure 4:
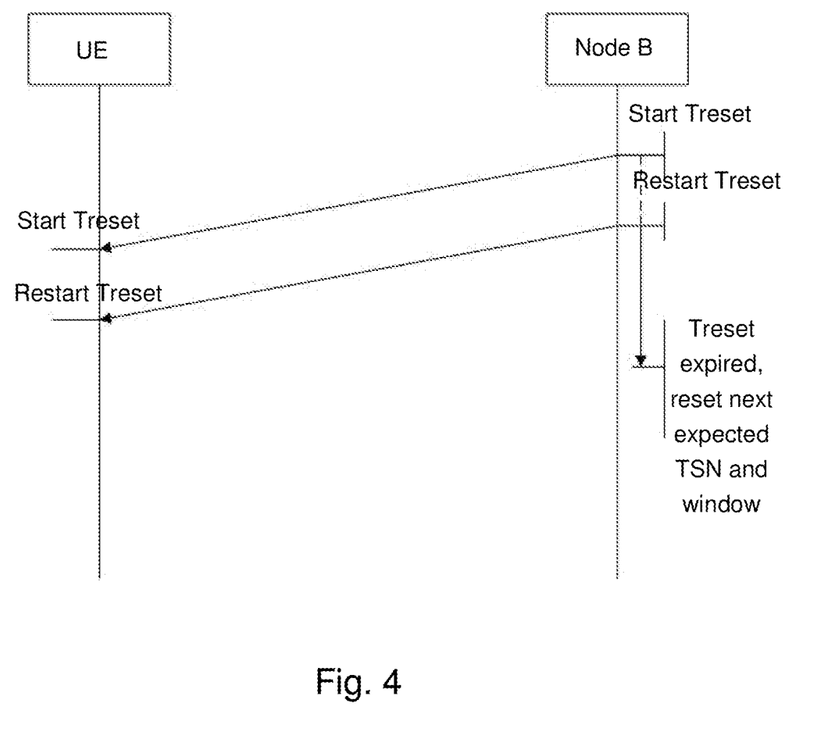
FIG. 4 illustrates schematically the signalling between a base station and a mobile terminal in a wireless communication network.

Turning now to FIG. 4 an example communication flow between UE and a Node B is schematically represented.

Both the UE and the network implement a reset timer, Treset. The timer is started (or restarted if it was already running) after each transmission using a common H-RNTI, and upon expiring the network and the UE both will set the next expected TSN and the window to their initial values (0 or special initial value for TSN).

In the Node B there is one reset timer for each common H-RNTI, where these timers may operate independently. In contrast, in the UE there may be only one reset timer, since the UE may be adapted to only receive data from the Node B using one common H-RNTI at a time.

The above mentioned and described embodiments are only given as examples and should not be limiting to the present invention. Other solutions, uses, objectives, and functions within the scope of the invention as claimed in the below described patent claims should be apparent for the person skilled in the art.

What is claimed is:

1. A method for managing communication at a mobile terminal, said method comprising:
receiving an initial transmission unit having a shared destination address and comprising an initial shared sequence number and a payload carrying data;
determining that the initial transmission unit was correctly received;
starting a first timer associated with transmission units having a common destination address and a common sequence number, wherein the first timer is independent of a second timer that is started when a subsequently received transmission unit has a sequence number that is higher than a next expected sequence number; and responsive to the first timer expiring, resetting the value of a sequence number for the next expected transmission unit and the upper boundary of a receiver window in the mobile terminal to respective predefined initial values.

2. The method of claim 1, further comprising restarting the first timer after correctly receiving a transmission unit and after determining that the first timer is still running.

3. The method of claim 1, wherein the initial transmission unit is received on a control channel with the mobile terminal in a state of connecting to a data downlink channel.

4. The method of claim 3, wherein the state comprises an Enhanced CELL_FACH state.

5. The method of claim 1, wherein the mobile terminal is operating in an FDD (Frequency Division Duplex) or TDD (Time Division Duplex) wireless communication network.

6. The method of claim 1, wherein the shared destination address is a common H-RNTI (HS-DSCH Radio Network Temporary Identifier).

7. A mobile terminal for communication in a wireless communication network, comprising:
   a communication circuit configured to receive an initial transmission unit having a shared destination address and comprising an initial shared sequence number and a payload carrying data;
   a processing circuit configured to determine that the initial transmission unit was correctly received;
   a measurement circuit comprising a first and second independent timers, wherein the first timer is associated with transmission units having a shared destination address and a shared sequence number, and wherein the second timer is started when a subsequently received transmission unit has a sequence number that is higher than a next expected sequence number; and
   wherein the processing circuit is further configured to instruct the measurement circuit to start the first timer associated with transmission units having a common destination address and a common sequence number, and is further configured to reset the value of a sequence number for the next expected transmission unit and the upper boundary of a receiver window in the mobile terminal to respective predefined initial values.

8. A mobile terminal in a wireless communication network, comprising:
   a transceiver configured to communicate over the wireless communication network; and
   a processing circuit operatively connected to the transceiver, said processing circuit configured to:
      receive, via said transceiver, an initial transmission unit having a shared destination address and comprising an initial shared sequence number and a payload carrying data;
      determine that the initial transmission unit was correctly received;
      start a first timer associated with transmission units having a common destination address and a common sequence number, wherein the first timer is independent of a second timer that is started when a subsequently received transmission unit has a sequence number that is higher than a next expected sequence number; and
      responsive to the first timer expiring, reset the value of a sequence number for the next expected transmission unit and the upper boundary of a receiver window in the mobile terminal to respective predefined initial values.

9. A non-transitory computer-readable medium storing a computer program for managing communication in a mobile terminal, said computer program comprising executable program instructions that configure a processing circuit in a mobile terminal to:
   receive an initial transmission unit having a shared destination address and comprising an initial shared sequence number and a payload carrying data;
   determine that the initial transmission unit was correctly received;
   start a first timer associated with transmission units having a common destination address and a common sequence number, wherein the first timer is independent of a second timer that is started when a subsequently received transmission unit has a sequence number that is higher than a next expected sequence number; and
   responsive to the first timer expiring, reset the value of sequence number for the next expected transmission unit and the upper boundary of a receiver window in the mobile terminal to respective predefined initial values.

* * * * *